United States Patent
Stoddard et al.

(10) Patent No.: US 7,216,919 B2
(45) Date of Patent: May 15, 2007

(54) VEHICLE-MOUNTED COVERED SANDER APPARATUS

(76) Inventors: Chad L. Stoddard, P.O. Box 629, Londonderry, VT (US) 05148; Edgar L. Stoddard, P.O. Box 234, South Londonderry, VT (US) 05155

( * ) Notice: Subject to any disclaimer, the term of this patent is extended or adjusted under 35 U.S.C. 154(b) by 174 days.

(21) Appl. No.: 10/895,598

(22) Filed: Jul. 21, 2004

(65) Prior Publication Data
US 2005/0017535 A1 Jan. 27, 2005

Related U.S. Application Data
(60) Provisional application No. 60/489,434, filed on Jul. 24, 2003.

(51) Int. Cl.
*B60J 7/00* (2006.01)
(52) U.S. Cl. ............... 296/100.09; 296/100.05; 296/37.6; 105/377.05; 239/668
(58) Field of Classification Search ........... 296/100.02, 296/100.03, 100.04, 100.05, 100.06, 100.07, 296/100.08, 100.09, 100.1, 37.6; 105/377.01, 105/377.05, 377.06, 377.09; 239/668
See application file for complete search history.

(56) References Cited
U.S. PATENT DOCUMENTS

| | | | |
|---|---|---|---|
| 496,163 A * | 4/1893 | Lebach | 298/24 |
| 3,819,120 A * | 6/1974 | Walker | 239/661 |
| 3,910,629 A * | 10/1975 | Woodard | 296/101 |
| 4,659,136 A | 4/1987 | Martin et al. | |
| 4,974,898 A | 12/1990 | Baranski | |
| 5,354,113 A | 10/1994 | Pettersson | |
| 5,765,901 A | 6/1998 | Wilkens | |
| 6,206,449 B1 | 3/2001 | Searfoss | |
| 2005/0252999 A1* | 11/2005 | Truan et al. | 239/661 |

* cited by examiner

*Primary Examiner*—Joseph D. Pape (57) ABSTRACT

A vehicle-mounted, covered container apparatus includes a container member, a telescopic collapsible cover assembly, and container-to-cover attachment means connected between the container member and the telescopic collapsible cover assembly. The container member can be a sander container. In this respect, the vehicle-mounted, covered container apparatus prevents snow and rain from getting inside the sander container and freezing the sand. Preferably, the telescopic collapsible cover assembly is dome-shaped. The telescopic collapsible cover assembly includes a plurality of rigid curved cover units that are dome segments and that are telescopic with respect to each other. In addition, the plurality of curved cover units are in the form of dome segments. Preferably, the container-to-cover attachment means include a pair of hinge pins connecting the first curved unit, the second curved unit, and the third curved unit together to each other and to the container member. The hinge pins are located on respective tops of sides of the container member.

9 Claims, 6 Drawing Sheets

VEHICLE-MOUNTED COVERED SANDER APPARATUS

CROSS-REFERENCE TO RELATED APPLICATION

This application claims priority based upon my copending Provisional Application Ser. No. 60/489,434, filed on or about Jul. 24, 2003.

BACKGROUND OF THE INVENTION

1. Field of the Invention

The present invention relates generally to vehicles that have containers for carrying particulate material, and, more particularly, to covers especially adapted for covering those vehicle containers.

2. Description of the Prior Art

Vehicles, such as sand trucks and dump trucks, carry particulate material in a container supported by the vehicle. Often the containers carried by the vehicle are open to rain, snow, and wind, so the particulate material that is carried may become wet or blown away. To avoid these problems, throughout the years, a number of innovations have been developed relating to covers for vehicle containers that are otherwise open. In this respect, the following U.S. patents are representative of some of those innovations: U.S. Pat. No. 4,659,136, 4,974,898, 5,354,113, 5,765,901, and 6,206,449.

More specifically, U.S. Pat. Nos. 4,659,136 and 4,974,898 disclose telescopic covers for truck beds. The respective covers include linearly translating telescopic cover members. As a result, each linearly translating cover member rides a pair of linear tracks with respect to an adjacent telescopic member. Unfortunately, it is relatively easy for particulate material, such as sand, to become trapped in the linear tracks and cause unwanted wear and damage to the tracks. In this respect, it would be desirable if telescopic covers for a vehicle bed were provided which do not employ linearly translating cover members along linear tracks.

U.S. Pat. Nos. 5,354,113, 5,765,901, and 6,206,449 disclose covers for vehicle beds which employ relatively soft, flexible cover members that are unrolled for use as a cover and rolled up when the cover is not needed. Such flexible covers are often easily torn. Moreover, when such flexible covers are torn, they often permit wind, rain, and snow to pass through the torn regions and disturb or contaminate the cover material. In this respect, it would be desirable if covers for a vehicle bed were provided which do not include flexible covers that are unrolled for use and rolled up when not in use.

Still other features would be desirable in a vehicle-mounted, covered sander apparatus. For example, there may be time when it is desired to access material in a container member in a vehicle bed from the side of the vehicle bed. At other times, it would be desirable to access material in the container member in the vehicle bed from the back of the vehicle bed. In this respect, it would be desirable to provide a cover for a container member in a vehicle bed which can be installed on the container member to allow access to the container member from the back of the vehicle bed or from the side of the vehicle bed, as desired.

Thus, while the foregoing body of prior art indicates it to be well known to use covers for vehicle beds or for containers in vehicle beds, the prior art described above does not teach or suggest a vehicle-mounted, covered sander apparatus which has the following combination of desirable features: (1) does not employ linearly translating cover members along linear tracks; (2) does not include flexible covers that are unrolled for use and rolled up when not in use; and (3) allows access to the container member from the back of the vehicle bed or from the side of the vehicle bed, as desired. The foregoing desired characteristics are provided by the unique vehicle-mounted, covered sander apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides, in general, a vehicle-mounted, covered container apparatus which includes a container member, a cover assembly which includes rigid cover units, and hinged container-to-cover attachment means connected between the container member and the cover assembly.

The container member can be a sander container. In this respect, the vehicle-mounted, covered container apparatus prevents snow and rain from getting inside the sander container and freezing the sand. Frozen sand in a sander can cause problems with the sander, especially the sand distributor assembly, and damage the sand distributor assembly. The vehicle-mounted, covered container apparatus of the invention is a preferred alternative to a flexible tarpaulin which is conventionally used to cover sand in a sander.

With one embodiment, the cover assembly is comprised of a telescopic collapsible cover assembly which includes rigid telescopic cover units, and the hinged container-to-cover attachment means are connected between the container member and the rigid telescopic cover units.

More specifically, the telescopic collapsible cover assembly includes a plurality of rigid curved cover units that are telescopic with respect to each other, and the container-to-cover attachment means include a pair of hinge pins connecting the plurality of rigid curved cover units together to each other.

The plurality of rigid telescopic cover units can include dome-shaped segments which include a first curved unit, a second curved unit telescopically received in the first curved unit, and a third curved unit telescopically received in the second curved unit. Also, the container-to-cover attachment means include a pair of hinge pins connecting the first curved unit, the second curved unit, and the third curved unit together to each other.

The hinge pins are located on respective tops of sides of the container member. The sides of the container member are located adjacent to sides of a vehicle in which the container member is carried. The sides of the container member are located adjacent to the front and rear of a vehicle in which the container member is carried.

The first curved unit includes a first radial length, the second curved unit includes a second radial length, the third curved unit includes a third radial length, and the first radial length is greater than the second radial length, and the second radial length is greater than the third radial length.

The first curved unit includes a rearwardly located, downwardly depending first unit stop member, the second curved unit includes a frontwardly located, upwardly extending second unit stop member, and the first unit stop member engages the second unit stop member when the first curved unit and the second curved unit are extended with respect to each other in a closed-cover mode. The second curved unit includes a rearwardly located, downwardly depending second unit stop member, the third curved unit includes a frontwardly located, upwardly extending third unit stop member, and the second unit stop member engages the third unit stop member when the second curved unit and the third curved unit are extended with respect to each other in a closed-cover mode.

The hinged container-to-cover attachment means are located along a hinge axis. With one class of embodiments, the hinge axis is perpendicular to a longitudinal axis of the vehicle on which the apparatus is mounted. In this respect, the sides of the container member that are attached to the hinge pins are located adjacent to sides of a vehicle in which the container member is carried.

With another class of embodiments, the hinge axis is parallel to a longitudinal axis of the vehicle on which the apparatus is mounted. In this respect, the sides of the container member in which the hinge pins are located can be adjacent to the front and rear of a vehicle in which the container member is carried.

With another embodiment of the invention, the cover assembly includes a first rigid clam-shell-like cover unit and a second rigid clam-shell-like cover unit. The hinged container-to-cover attachment means include a first-clam-shell hinge for connecting the first rigid clam-shell-like cover unit to the container member and include a second-clam-shell hinge for connecting the second rigid clam-shell-like cover unit to the container member.

With another embodiment of the invention, the cover assembly includes a single rigid dome member. The hinged container-to-cover attachment means include a dome-to-container hinge for connecting the single rigid dome member to the container member, and dome raising and lowering means are connected between the single rigid dome member and the container member for raising and lowering the single rigid dome member with respect to the container member, around the dome-to-container hinge. Preferably, the dome raising and lowering means include hydraulic support struts.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a number of preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved vehicle-mounted, covered sander apparatus which has all of the advantages of the prior art and none of the disadvantages.

It is another object of the present invention to provide a new and improved vehicle-mounted, covered sander apparatus which may be easily and efficiently manufactured and marketed.

It is a further object of the present invention to provide a new and improved vehicle-mounted, covered sander apparatus which is of durable and reliable construction.

An even further object of the present invention is to provide a new and improved vehicle-mounted, covered sander apparatus which is susceptible of a low cost of manufacture with regard to both materials and labor, and which accordingly is then susceptible of low prices of sale to the consuming public, thereby making such vehicle-mounted, covered sander apparatus available to the buying public.

Still yet a further object of the present invention is to provide a new and improved vehicle-mounted, covered sander apparatus which does not employ linearly translating cover members along linear tracks.

Still another object of the present invention is to provide a new and improved vehicle-mounted, covered sander apparatus that does not include flexible covers that are unrolled for use and rolled up when not in use.

Yet another object of the present invention is to provide a new and improved vehicle-mounted, covered sander apparatus which allows access to the container member from the back of the vehicle bed or from the side of the vehicle bed, as desired.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein.

DESCRIPTION OF THE PREFERRED EMBODIMENT

With reference to the drawings, a new and improved vehicle-mounted, covered sander apparatus embodying the principles and concepts of the present invention will be described.

In general, in accordance with the invention, a vehicle-mounted, covered container apparatus 10 includes a container member 12, a cover assembly which includes rigid cover units, and hinged container-to-cover attachment means connected between the container member 12 and the cover assembly 14.

Turning to FIGS. 1–6, there is shown a first preferred embodiment of the vehicle-mounted, covered sander apparatus of the invention generally designated by reference numeral 10. In the first preferred embodiment, a vehicle-mounted, covered sander apparatus 10 is mounted on a vehicle or truck bed 11 and includes a container member 12, a telescopic collapsible cover assembly 14, and container-to-cover attachment means connected between the container member 12 and the telescopic collapsible cover assembly 14.

The container member 12 can be a sander container 12. In this respect, the vehicle-mounted, covered container apparatus 10 prevents snow and rain from getting inside the sander container 12 and freezing the sand 19. Frozen sand in a sander can cause problems with the sander, especially the sand distributor assembly 21, and damage the sand distributor assembly 21. The vehicle-mounted, covered container apparatus 10 of the invention is a preferred alternative to a flexible tarpaulin which is conventionally used to cover sand in a sander.

Figure 1:
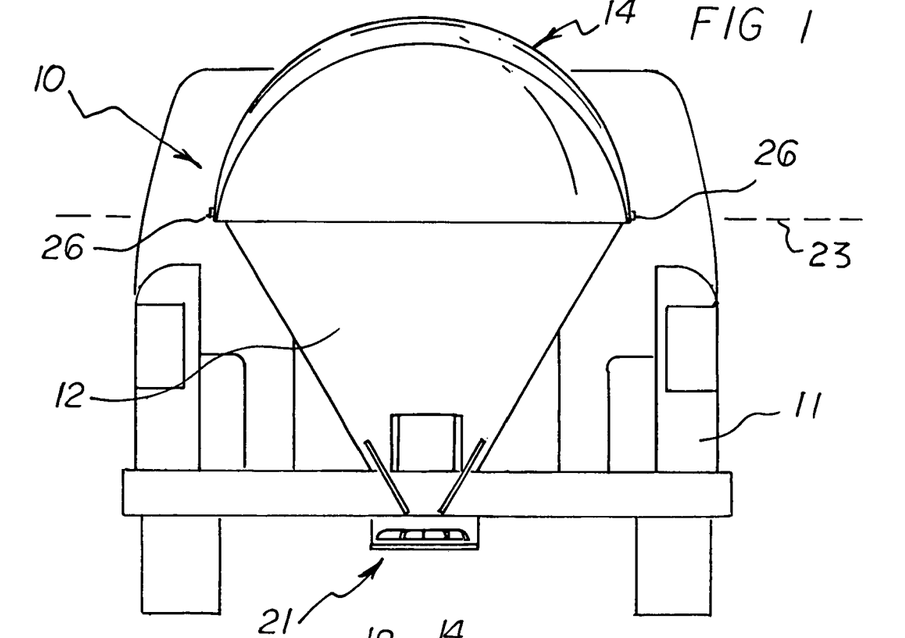
FIG. 1 is a rear view showing a first preferred embodiment of the vehicle-mounted, covered sander apparatus of the invention, in a fully closed orientation and installed on the bed of a pickup truck.
Figure 2:
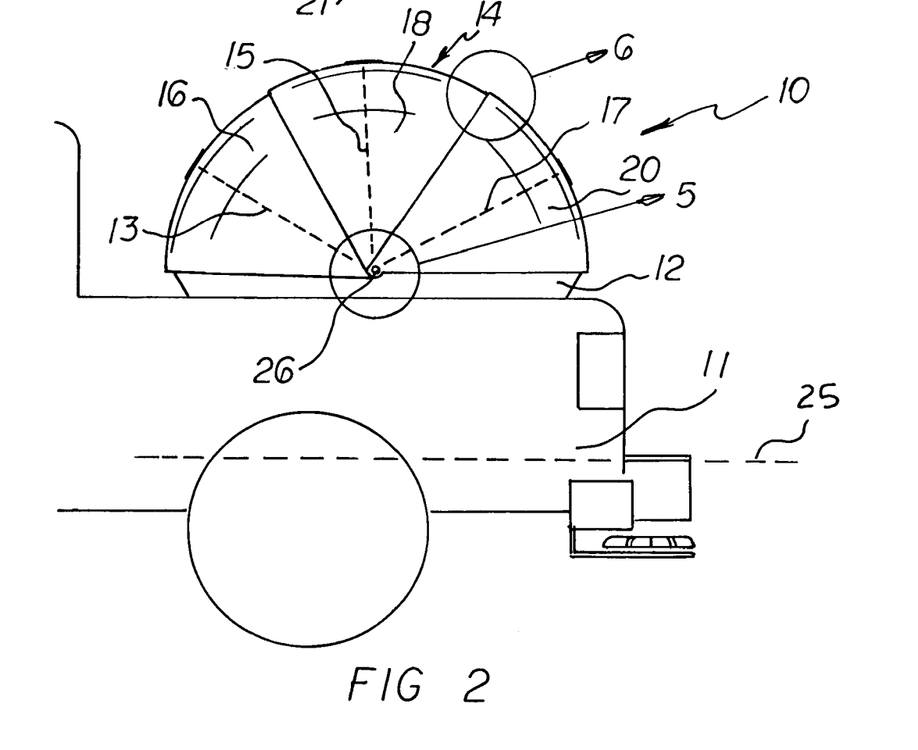
FIG. 2 is a side view of the embodiment of the vehicle-mounted, covered sander apparatus shown in FIG. 1.
Figure 3:
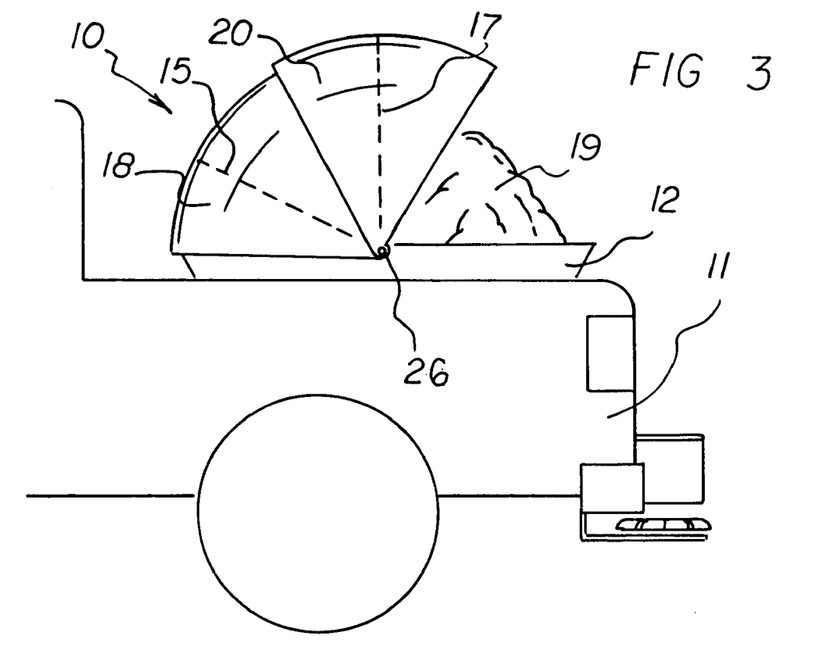
FIG. 3 is a side view of the embodiment of the vehicle-mounted, covered sander apparatus of FIG. 2, wherein the apparatus is in a partially open orientation.
Figure 4:
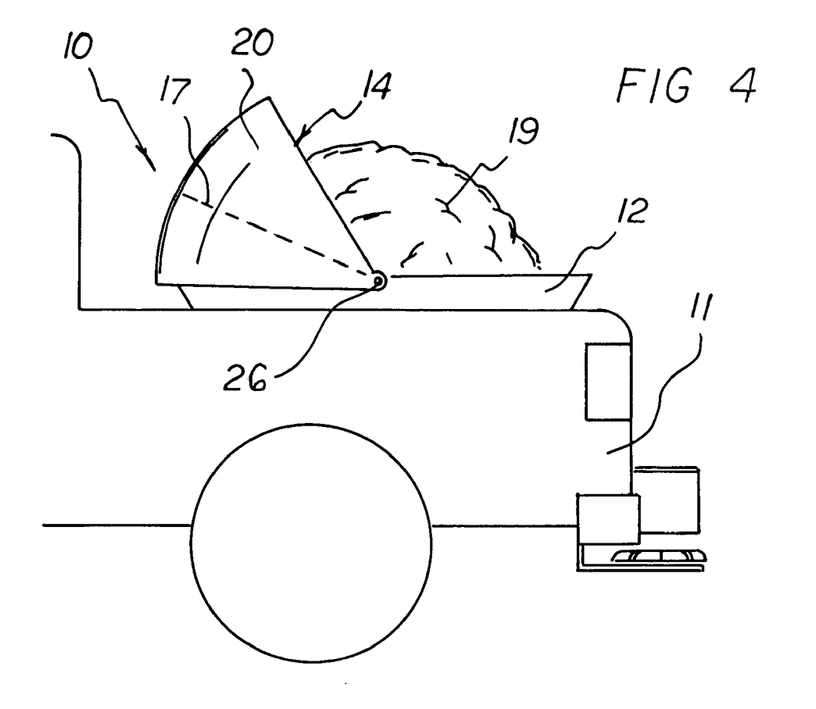
FIG. 4 is a side view of the embodiment of the invention shown in FIG. 3, wherein the apparatus is in a fully open orientation.
Figure 5:
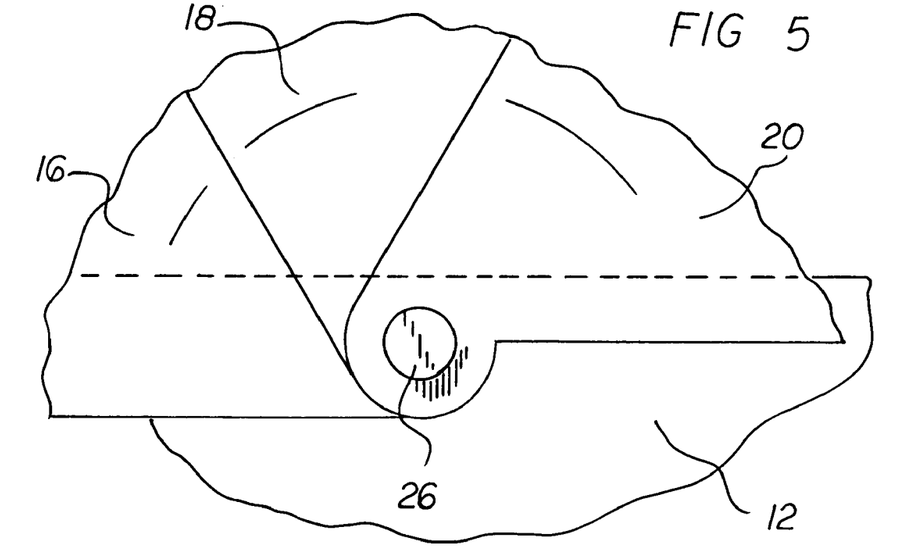
FIG. 5 is an enlarged side view of the portion of the embodiment of the invention shown in FIG. 2, contained in circled region 5 thereof.
Figure 6:
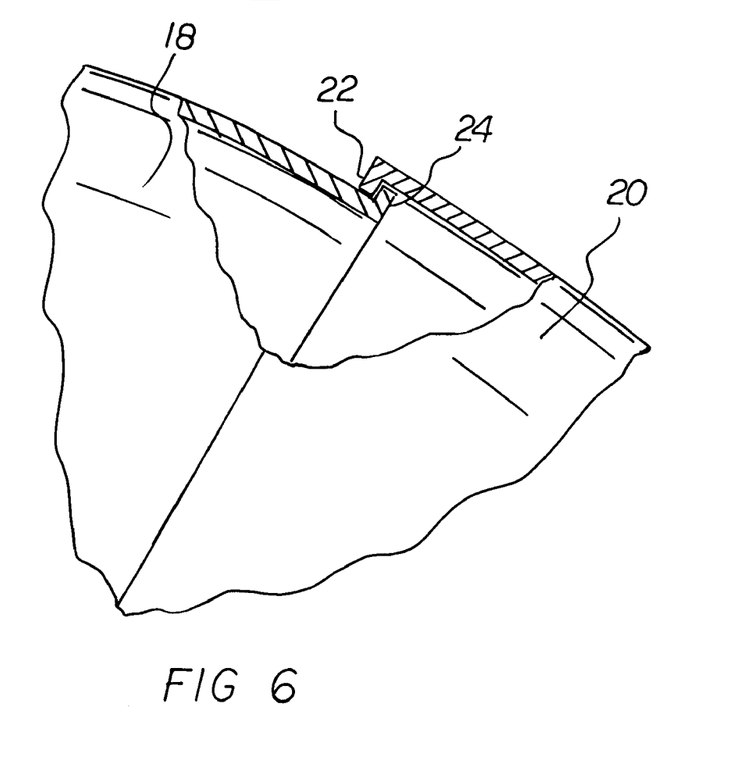
FIG. 6 is an enlarged side view of the portion of the embodiment of the invention shown in FIG. 2, contained in circled region 6 thereof.

As shown in FIGS. 3 and 4, the container member 12 includes a quantity of sand 19. As shown in FIG. 1, the sander container 12 includes a sand distributor assembly 21 located at the bottom of the sander container 12.

Preferably, the telescopic collapsible cover assembly 14 is dome-shaped. The telescopic collapsible cover assembly 14 includes a plurality of rigid curved cover units that are telescopic with respect to each other. Preferably, the rigid curved cover units are made from rigid plastic.

In addition, the plurality of curved cover units are in the form of dome segments. More specifically, the plurality of curved cover units include a first curved unit 20, a second curved unit 18 telescopically received in the first curved unit 20, and a third curved unit 16 telescopically received in the second curved unit 18.

Preferably, the container-to-cover attachment means include a pair of hinge pins 26 connecting the first curved unit 20, the second curved unit 18, and the third curved unit 16 together to each other. The hinge pins 26 are located on respective tops of sides of the container member 12. Hinge pins 26 that are connected to the respective curved units 16, 18, and 20 are located on opposite ends of a hinge axis 23. With the embodiment of the invention shown in FIGS. 1–6, the hinge axis 23 is perpendicular to the longitudinal axis 25 of the vehicle 11.

The sides of the container member 12 are located adjacent to sides of a vehicle in which the container member 12 is carried. When the sides of the container member 12 in which the hinge pins 26 are located are adjacent to sides of the vehicle, then the telescopic collapsible cover assembly 14 can be easily moved from the closed-cover mode to the open-cover mode, and vice versa, by a person located at a side of the vehicle.

Alternatively, the sides of the container member 12 can be located adjacent to the front and rear of a vehicle in which the container member 12 is carried.

The first curved unit 20 includes a first radial length 17. The second curved unit 18 includes a second radial length 15. The third curved unit 16 includes a third radial length 13. The first radial length 17 is greater than the second radial length 15, and the second radial length 15 is greater than the third radial length 13.

The first curved unit 20 includes a rearwardly located, downwardly depending first unit stop member 22. The second curved unit 18 includes a frontwardly located, upwardly extending second unit stop member 24. The first unit stop member 22 engages the second unit stop member 24 when the first curved unit 20 and the second curved unit 18 are extended with respect to each other in a closed-cover mode.

In addition, the second curved unit 18 includes a rearwardly located, downwardly depending second unit stop member. The third curved unit 16 includes a frontwardly located, upwardly extending third unit stop member. The second unit stop member engages the third unit stop member when the second curved unit 18 and the third curved unit 16 are extended with respect to each other in a closed-cover mode.

When the telescopic collapsible cover assembly 14 is in the closed-cover mode, such as shown in FIGS. 1, 2, 5, and 6, all three of the curved units 16, 18, and 20 are fully extended with respect to each other. The transition from the closed-cover mode to the open-cover mode can occur back-to-front, as shown progressively from FIG. 2, to FIG. 3, and to FIG. 4, wherein the open-cover mode is achieved. In FIG. 3, the first curved unit 20 has been moved around the hinge pins 26 and over the second curved unit 18. In FIG. 4, both the first curved unit 20 and the second curved unit 18 have been moved around the hinge pins 26 and over the third curved unit 16. In this respect, the vehicle-mounted, covered container apparatus 10 is in the open-cover mode. Alternatively, the transition from the closed-cover mode to the open-cover mode can occur front-to-back (not shown).

Numerous variations within the spirit of our invention will readily occur to those skilled in the art. For example, in the alternatively preferred embodiments illustrated in FIGS. 7–12, the hinge axis 23 is parallel to a longitudinal axis 25 of the vehicle 11 on which the apparatus is mounted. As a result, the respective cover units open from one side of the truck toward the other, opposed side thereof. This arrangement facilitates easy loading from the side of the vehicle.

Figure 7:
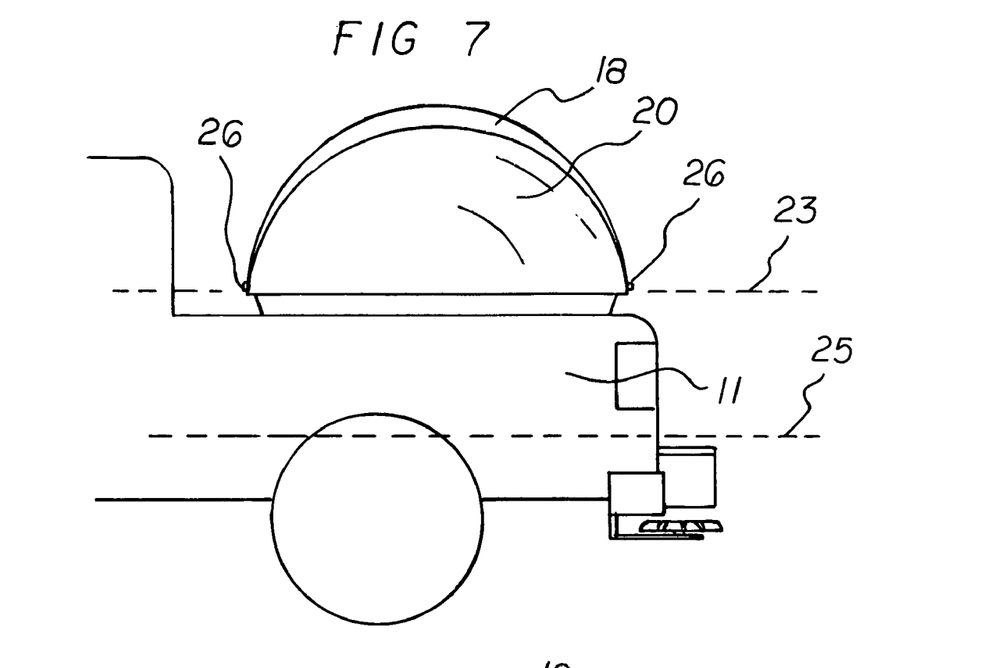
FIG. 7 is a side view of a second preferred embodiment of the vehicle-mounted, covered sander apparatus of the present invention wherein the hinge axis is parallel to the longitudinal axis of the truck bed and the curved cover units open from one side of the vehicle toward the other side thereof.
Figure 8:
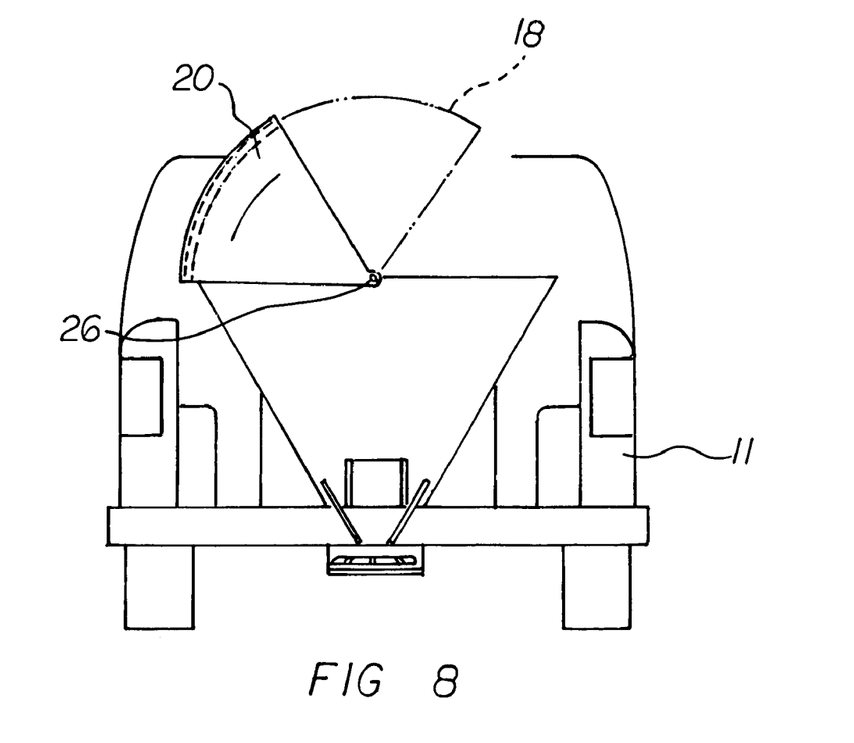
FIG. 8 is a rear view showing the embodiment of FIG. 7.

With the embodiment of the invention shown in FIGS. 7 and 8, a first curved telescopic unit 20 is fixed or stationary, and the second curved telescopic unit 18 and the third curved telescopic unit 16 are employed so that the second curved telescopic unit 18 and the third curved telescopic unit 16 telescopically slide or nest into the fixed first curved telescopic unit 20 substantially as illustrated in FIG. 8.

Figure 9:
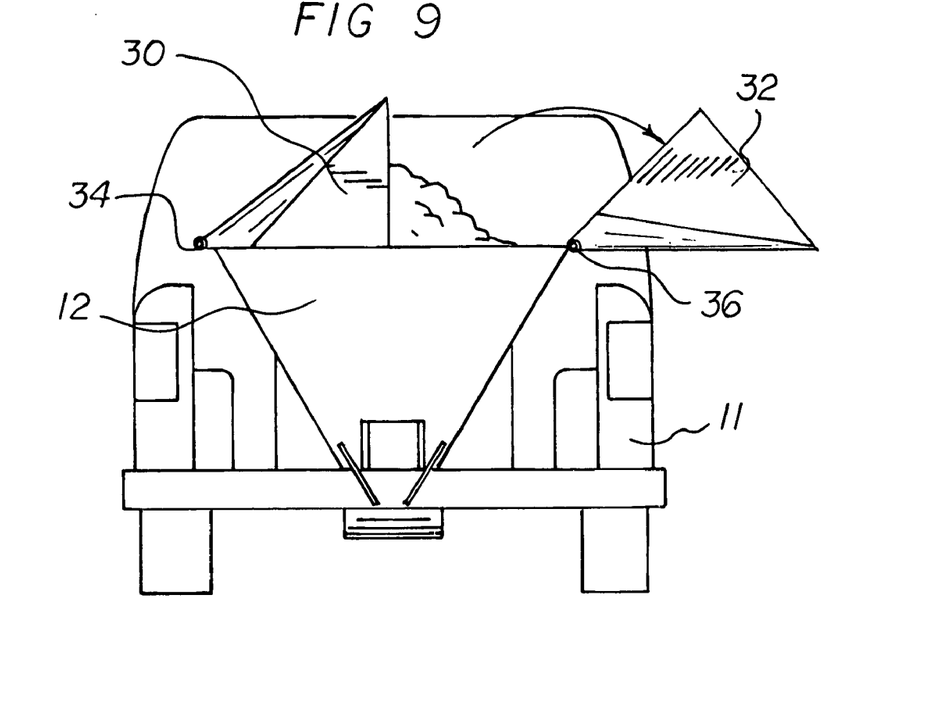
FIG. 9 is a rear view of a third preferred embodiment of the vehicle-mounted, covered sander apparatus of the present invention wherein the cover units are in the form of a pair doors peaked in the center like a house roof that open and close oppositely in directions toward the sides of the truck bed or vehicle, respectively.
Figure 10:
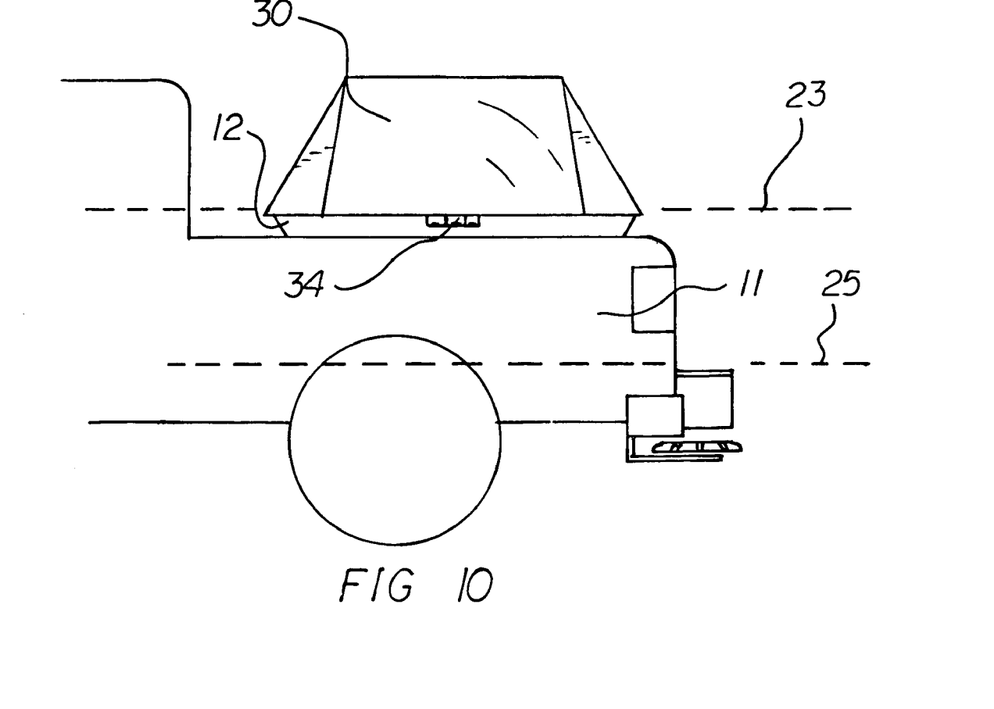
FIG. 10 is a side view of the embodiment of FIG. 9.

As shown in FIGS. 9 and 10, the curved cover units may be replaced by a pair of oppositely opening (and closing) rigid clam-shell-like cover units that are peaked in the center like the roof of a house wherein the doors move on separate hinge axes toward and away from the respective sides of the vehicle. More specifically, the cover assembly includes a first rigid clam-shell-like cover unit 30 and a second rigid clam-shell-like cover unit 32. The hinged container-to-cover attachment means include a first-clam-shell hinge 34 for connecting the first rigid clam-shell-like cover unit 30 to the container member 12 and includes a second-clam-shell hinge 36 for connecting the second rigid clam-shell-like cover unit 32 to the container member 12.

Figure 11:
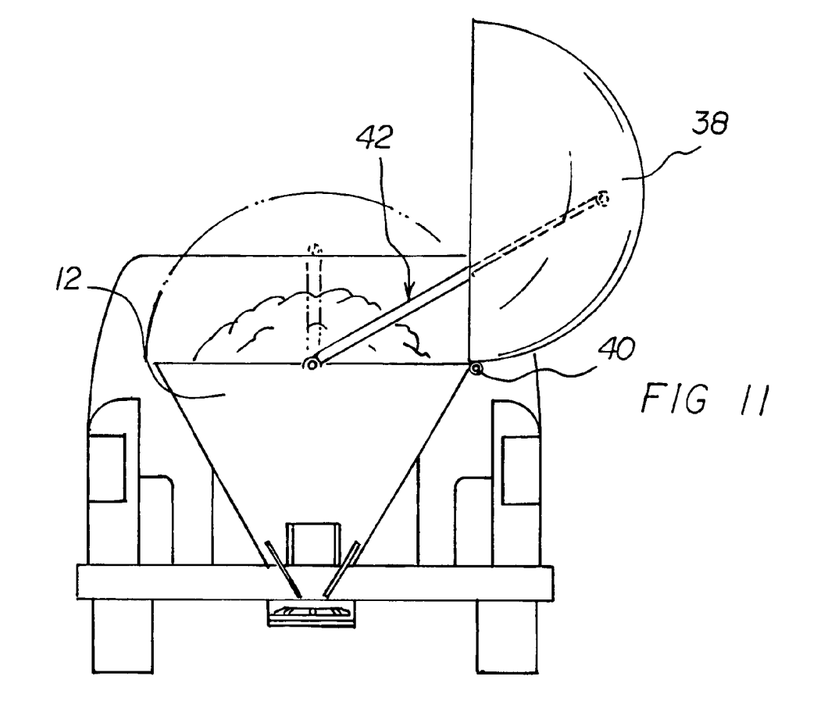
FIG. 11 is a rear view of a fourth preferred embodiment of the vehicle-mounted, covered sander apparatus of the present invention wherein the cover unit is a one-piece half dome hinged adjacent to one side of the vehicle truck bed and opens and closes in a direction toward the opposite side thereof with the aid of hydraulic support struts.
Figure 12:
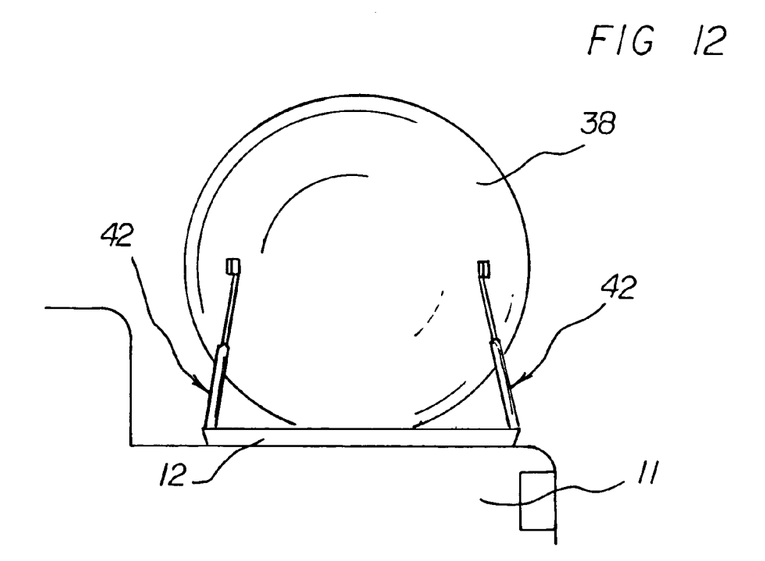
FIG. 12 is a side view of the embodiment of FIG. 11.

As shown in FIGS. 11 and 12, plural curved cover units may be replaced by a one-piece dome hingedly attached on one side of the container top rim. In this alternatively preferred arrangement, the dome may open much like a single door from one side to the other. More specifically, the cover assembly includes a single rigid dome member 38. The hinged container-to-cover attachment means include a dome-to-container hinge 40 for connecting the single rigid dome member 38 to the container member 12, and dome raising and lowering means are connected between the single rigid dome member 38 and the container member 12 for raising and lowering the single rigid dome member 38 with respect to the container member 12, around the dome-to-container hinge 40. Preferably, the dome raising and lowering means include hydraulic support struts 42. The hydraulic support struts 42 can be conventional hydraulic struts of a known construction that may be optionally employed to enhance the strength and stability of the apparatus.

The components of the vehicle-mounted, covered sander apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved vehicle-mounted, covered sander apparatus that is low in cost, relatively simple in design and operation, and which advantageously does not employ linearly translating cover members along linear tracks. With the invention, a vehicle-mounted, covered sander apparatus is provided which does not include flexible covers that are unrolled for use and rolled up when not in use. With the invention, a vehicle-mounted, covered sander apparatus is provided which allows access to the container member from the back of the vehicle bed or from the side of the vehicle bed, as desired.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the annexed Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A vehicle-mounted, covered container apparatus, comprising:
   a container member,
   a cover assembly including rigid cover units, and hinged container-to-cover attachment means connected between said container member and said cover assembly,
   wherein said cover assembly is comprised of a telescopic collapsible cover assembly which includes rigid telescopic cover units, and
   said hinged container-to-cover attachment means are connected between said container member and said rigid telescopic cover units, and
   wherein said telescopic collapsible cover assembly includes a plurality of rigid curved cover units that are telescopic with respect to each other,
   wherein said plurality of rigid telescopic cover units include:
   a first curved unit,
   a second curved unit telescopically received in said first curved unit, and
   a third curved unit telescopically received in said second curved unit, and
   wherein said container-to-cover attachment means include a pair of hinge pins connecting said first curved unit, said second curved unit, and said third curved unit to each other, and
   wherein said hinge pins are located on respective tops of sides of said container member.

2. The apparatus of claim 1 wherein said container member is a sander container.

3. The apparatus of claim 1 wherein said sides of said container member are located adjacent to sides of a vehicle in which said container member is carried.

4. The apparatus of claim 1 wherein said sides of said container member are located adjacent to the front and rear of a vehicle in which said container member is carried.

5. The apparatus of claim 1 wherein:
   said first curved unit includes a first radial length,
   said second curved unit includes a second radial length,
   said third curved unit includes a third radial length, and
   said first radial length is greater than said second radial length, and said second radial length is greater than said third radial length.

6. A vehicle-mounted, covered container apparatus, comprising:
a container member,
a cover assembly including rigid cover units, and hinged container-to-cover attachment means connected between said container member and said cover assembly.
wherein said cover assembly is comprised of a telescopic collapsible cover assembly which includes rigid telescopic cover units, and
said hinged container-to-cover attachment means are connected between said container member and said rigid telescopic cover units,
wherein said telescopic collapsible cover assembly includes a plurality of rigid curved cover units that are telescopic with respect to each other,
wherein said plurality of rigid telescopic cover units include a first curved unit,
a second curved unit telescopically received in said first curved unit, and
a third curved unit telescopically received in said second curved unit,
wherein said first curved unit includes a first radial length, said second curved unit includes a second radial length, said third curved unit includes a third radial length, and said first radial length is greater than said second radial length, and said second radial length is greater than said third radial length, and
wherein said first curved unit includes a rearwardly located, downwardly depending first unit stop member,
said second curved unit includes a frontwardly located, upwardly extending second unit stop member, and
said first unit stop member engages said second unit stop member when said first curved unit and said second curved unit are extended with respect to each other in a closed-cover mode.

7. The apparatus of claim 6 wherein:
said second curved unit includes a rearwardly located, downwardly depending second unit stop member,
said third curved unit includes a frontwardly located, upwardly extending third unit stop member, and
said second unit stop member engages said third unit stop member when said second curved unit and said third curved unit are extended with respect to each other in a closed-cover mode.

8. The apparatus of claim 6 wherein said hinged container-to-cover attachment means are located along a hinge axis.

9. The apparatus of claim 8 wherein said hinge axis is perpendicular to a longitudinal axis of a vehicle on which said apparatus is mounted.

* * * * *